Oct. 29, 1963 R. F. SMITH 3,108,660
HYDRODYNAMIC BRAKE
Filed Sept. 11, 1961 6 Sheets-Sheet 1

INVENTOR.
RAY F. SMITH
BY Kimmel & Crowell
ATTORNEYS.

INVENTOR.
RAY F. SMITH
BY Kimmel & Crowell
ATTORNEYS.

FIG. 5

INVENTOR.
RAY F. SMITH
BY
Kimmel & Crowell
ATTORNEYS.

INVENTOR.
RAY F. SMITH
BY Kimmel & Crowell
ATTORNEYS.

Oct. 29, 1963    R. F. SMITH    3,108,660
HYDRODYNAMIC BRAKE

Filed Sept. 11, 1961    6 Sheets-Sheet 6

INVENTOR.
RAY F. SMITH
BY Kimmel & Crowell
ATTORNEYS.

United States Patent Office 3,108,660
Patented Oct. 29, 1963

3,108,660
HYDRODYNAMIC BRAKE
Ray F. Smith, 2285 Carlisle Road, York, Pa.
Filed Sept. 11, 1961, Ser. No. 137,466
15 Claims. (Cl. 188—90)

This invention relates to a hydrodynamic brake for motor vehicles, principally for motor vehicles of the tractor type.

In the application of a braking system to tractor type trucks, a serious problem is encountered due to the extremely large amount of brake horsepower required. This arises from the high speeds at which such trucks travel and the weight of the truck and the load carried by same. The ordinary friction drum type of brake system is not satisfactory on account of the relatively short life of the brake linings. Through the use of a hydrodynamic brake, the disadvantages of friction drums and brake linings are avoided.

The present invention is an improvement over the invention described and illustrated in my prior Patent No. 2,775,318, also entitled Hydrodynamic Brake. One of the principal features by which the present invention is an improvement over that in my prior patent is in the use of a single impeller wheel, instead of two impeller wheels and one turbine wheel, as in the structure according to my prior patent, thereby resulting in a more compact unit.

The object of the present invention is to provide a hydrodynamic brake which will automatically take care of the brake application at travelling speeds above ten (10) miles per hour.

Another object of the present invention is to provide a hydrodynamic brake in which the braking action is controlled by the accelerator pedal and takes place during the last third of the travel upon release of the pedal.

A further object of the present invention is to provide a hydrodynamic brake in which the moving parts are directly connected to the drive shaft of the motor vehicle and function as an additional flywheel when braking action is not being effected.

An additional object of the present invention is the provision of a disc type brake for braking at low speeds in conjunction with a hydrodynamic brake wherein the braking disc is spring biased into engagement with the impeller wheel, is held out of engagement with the impeller wheel during normal travelling speeds of the vehicle, and is manually releasable when starting the vehicle.

A still further object of the present invention is the provision of a second disc type brake for emergency use in conjunction with a hydrodynamic type brake wherein the braking disc is movable by a manually operable linkage into engagement with a rotatable member directly connected to the driving shaft of the motor vehicle and drivably connected to the impeller wheel of the hydrodynamic brake through speed reduction gearing.

Still other objects, advantages and improvements will become apparent from the following specification, taken in connection with the accompanying drawings, in which.

Figure 1:
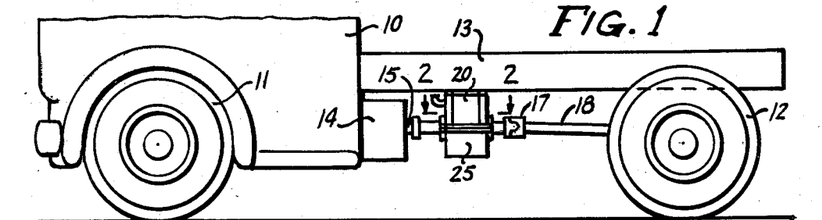
FIGURE 1 is a side elevation view of a tractor type truck with the hydrodynamic brake according to the present invention applied to same.
Figures 3, 4:
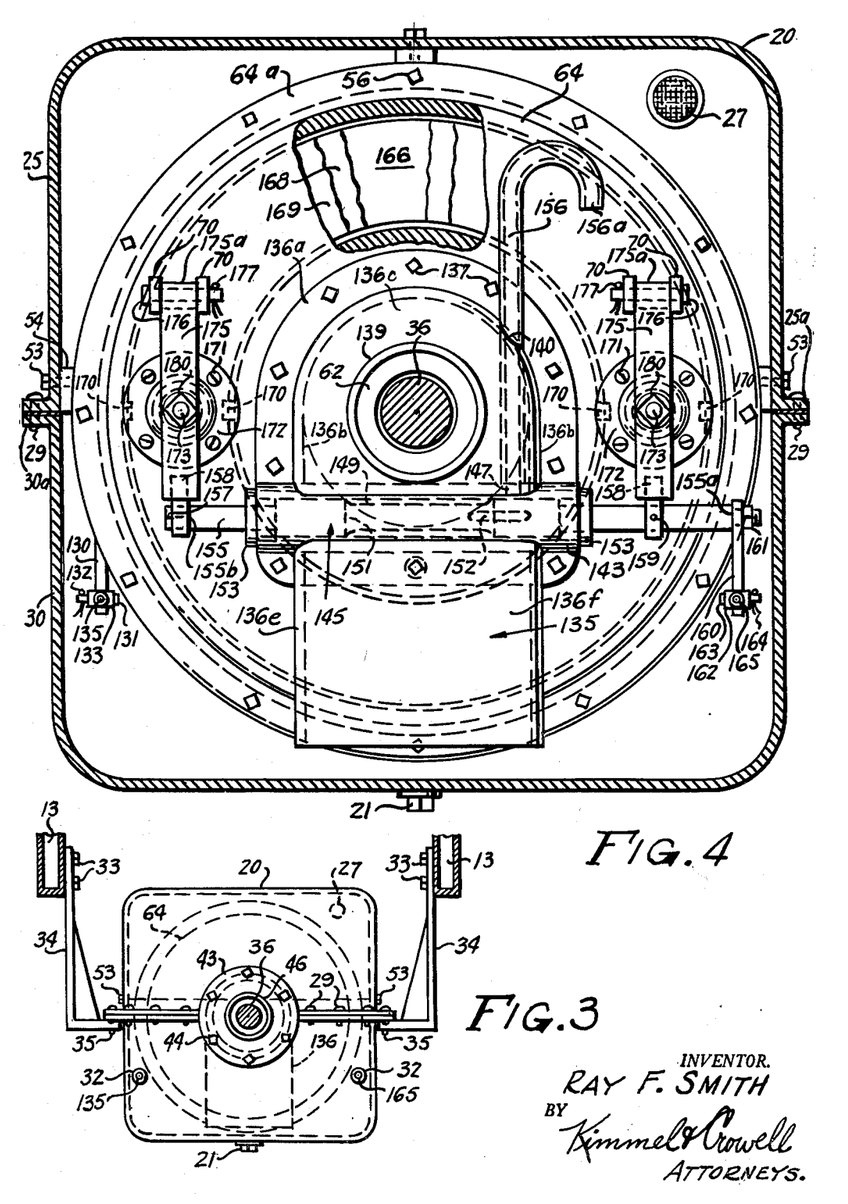
FIGURE 3 is an end elevation view, partly in section, taken on the section line 3—3 of FIGURE 2 and looking in the direction of the arrows.
FIGURE 4 is a vertical sectional view, taken on the section line 4—4 of FIGURE 2 and looking in the direction of the arrows, showing the linkage which operates the disc type brake, when braking at low speeds.

Referring now to the drawings in detail and FIGURES 1 and 3 in particular, there is shown in FIGURE 1 at 10 the engine hood of a tractor type truck. The truck has front wheels 11, rear wheels 12, and a chassis comprised in part by side frame members 13—13. A housing 14 is mounted on the chassis in any suitable manner (not shown) and encloses a transmisison to which the engine (also not shown) is drivably connected. A drive shaft 15 extends rearwardly from the housing 14. In the conventional construction employing friction drum type brakes, the drive shaft 15 is connected by a coupling 17 to a driven shaft 18, which in turn is connected to a differential (not shown) on the axle mounting the rear wheels 12.

Figure 8:
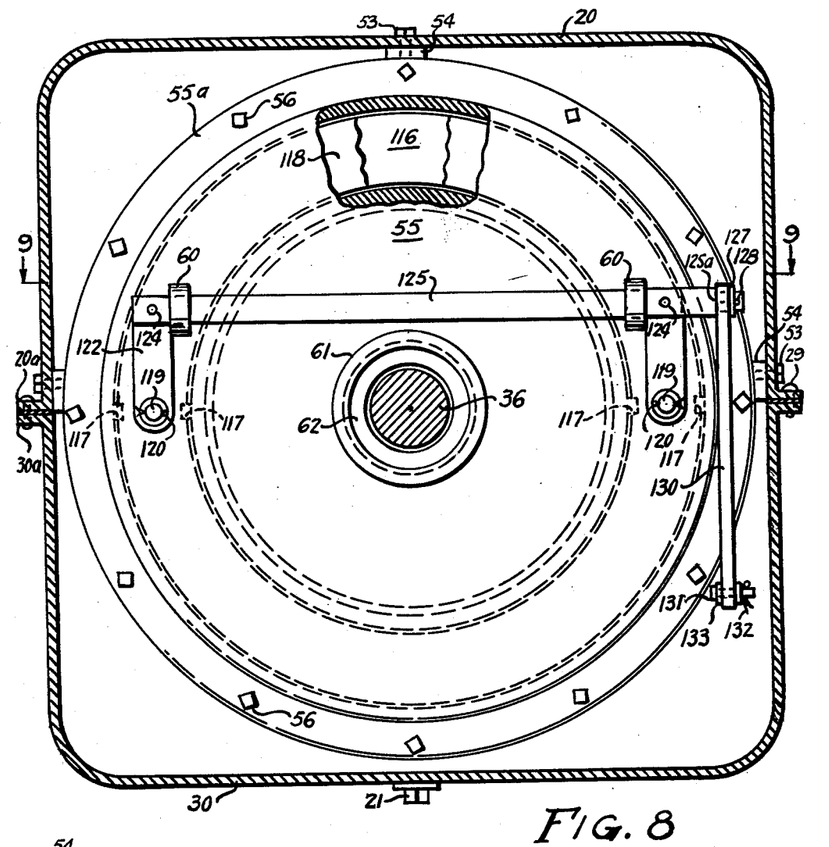
FIGURE 8 is a vertical sectional view, taken on the section line 8—8 of FIGURE 2 and looking in the direction of the arrows, showing the operating linkage for the emergency brake.
Figure 9:
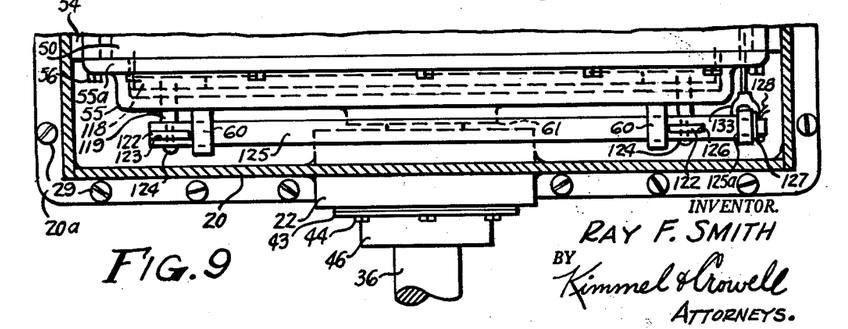
FIGURE 9 is a horizontal sectional view, taken on the section line 9—9 of FIGURE 8, and looking in the direction of the arrows.

The hydrodynamic brake according to the present invention is enclosed by a housing formed as an upper half 20 and a complementary lower half 25. The lower half 25 is rectangular in cross section to form an oil receptacle; the upper half 20 may be semi-circular in cross section, to conform to the shape of certain enclosed parts to be later described, but is preferably also rectangular in cross section, as shown in FIGURE 8. As so shaped, it functions as an expansion chamber and a settling volume for the oil vapor. The two halves have mating flanges 20a and 30a along their sides and ends and are secured together by bolts 29, which extend through aligned holes in these flanges. The lower half 20 of the housing has a plug 21 therein for draining oil from the housing. In general, the oil level will be maintained slightly above the mating plane of the upper and lower housing sections 20 and 30, as shown by the dashed line in FIGURE 3. A breather 27 for the housing is provided. This breather is mounted in a suitable hole 24 in the upper half 20 of the housing. A screen 25, preferably a 100 mesh, is mounted over the entrance to the breather 27 and is held in place by a Z-ring 26, which latter is secured to the inner wall of the housing section 20 in any suitable manner, as by welding. At its upper end the breather 27 has removably secured therein a cap 28. The breather 27 serves to filter air entering the housing and to prevent the exit of oil vapor from same. It may also be used as an oil filling opening, if desired. Brackets 34 are provided for mounting the housing on the side frame members 13—13 of the chassis and these brackets are attached to the side frame members by bolts 33 and to the housing sections by bolts 35, which latter also extend through aligned holes in the mating flanges 20a and 30a.

A shaft 36 is rotatably mounted in the housing 20—30. This shaft is connected at one end by a coupling 16 to the drive shaft 15 from the transmission (not shown) and at the other end by the coupling 17 to the driven shaft 18. The shaft 36 is reduced in diameter in three stages from the transverse central plane of the housing toward the forward end. The first stage forms a threaded section 36a, the second stage a shoulder 36b, and the third stage a threaded section 36c. Similarly, the shaft 36 is reduced in diameter in two stages from the transverse central plane of the housing to the rear end. The first stage forms a threaded section 36d and the second stage a threaded section 36e.

The rotatable bearing support for the shaft 36 in the housing is comprised by a pair of roller bearings 37—37. The front roller bearing 37 has its inner race force fitted onto the shaft 36 between the shoulder 36b and the threaded section 36c. A nut 39 is received on the threaded section 36c and serves to hold the inner race against the shoulder 36c, a washer 38 being placed intermediate the nut and the inner race. The outer race of the roller bearing is received in a sleeve 40 and abuts an internal shoulder 40a at the inner end of the sleeve. At both ends the sleeve 40 is reduced in diameter to form a central rim 40b. This sleeve 40 is in turn received in a split collar 22, which is secured to the housing sections 20 and 30, as by welding. The collar 22 is internally recessed to form a cylindrical groove 22a, which receives the central rim 40b on the sleeve 40. Along approximately its mid-transverse plane the collar 22 is formed with an internal groove 22b and likewise along approximately its mid-transverse plane the sleeve 40 is formed with a complementary groove 40c and a locking ring 41 is positioned in the aligned grooves.

A sealing cap is secured to the outer end of the sleeve 40. This cap is comprised in part by a plate 43, which has a central hole 45 therein for receiving the shaft 36 with minimum clearance. Around its periphery the plate 43 has arcuately spaced holes therein through which screws 44 extend into aligned screw threaded holes in the sleeve 40. A ring gasket 42 is placed intermediate the plate 43 and the sleeve 40. On its outer face the plate 43 has secured thereto, as by welding, a cup 46, which is concentrically positioned with respect to the hole 45 in the plate. An oil seal 47 is positioned within this cup in contact with the shaft 36 and is held in place by a snap ring 48, which is received in an internal groove 46a adjacent the outer end of the cup.

The rear roller bearing 34 is mounted in a split collar 23, which is likewise secured to the housing sections 20 and 30, as by welding. The outer race of the bearing abuts an internal flange 23a on the collar 23 and a nut 39 is received on the threaded section 36e of the shaft, a washer 38 being positioned intermediate the nut 39 and the inner race. Similarly, a sealing cap, likewise comprised by a plate 43 and a cup 46, surrounds the shaft 36 outwardly of the bearing 37 and is secured to the housing sections 20 and 30 by screws 44.

Figure 5:
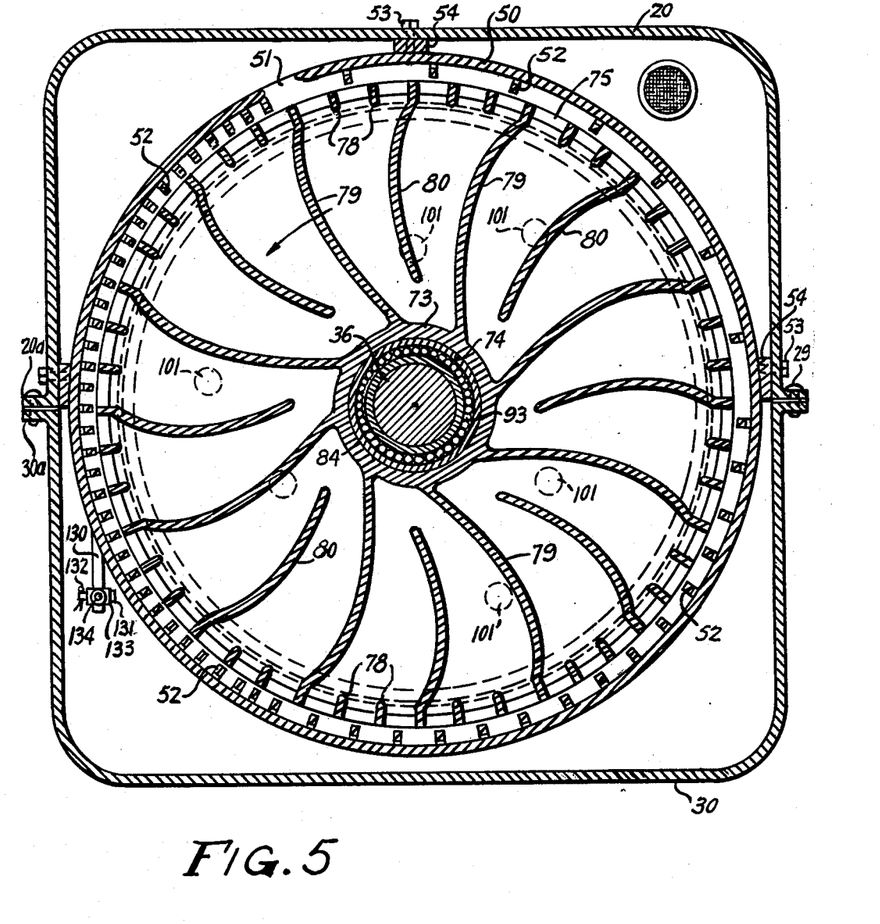
FIGURE 5 is a vertical sectional view, taken on the section line 5—5 of FIGURE 2 and looking in the direction of the arrows, showing the detailed construction of the impeller wheel.

The casing for the impeller wheel is formed in three parts, a central barrel and two ends. The central barrel 50 is shaped substantially as a hollow cylinder. An oil outlet opening 51 is formed in the wall of the barrel 50 adjacent the top of the latter. On its inner circumference the barrel 50 is formed with arcuately spaced vanes 52. As shown in FIGURE 5, the spacing of these vanes decreases progressively in the clockwise direction around the barrel 50 from the vertical center line to the oil outlet opening 51. The barrel 50 is mounted in the upper half 20 of the housing by shims 54 and bolts 53, which latter extend freely through holes in the housing and aligned holes in the shims and are received in aligned screw threaded holes in the barrel. As shown in FIGURE 5, the shims 54 are positioned along the vertical center line and at approximately the mating plane of the housing sections 20 and 30.

The front end of the casing is comprised by a crowned central section 55 and a perimetrical flange 55a. This front end is secured to the barrel 50 by bolts 56, which extend freely through holes in the flange 56a and are received in aligned screw threaded holes in the barrel. At its center the front end is formed with a hub 61, which is secured thereto, as by welding. An oil seal 62 is received in the hub 61 and contacts the drive shaft 36 between the threaded section 36a and the shoulder 36b thereon.

Similarly, the rear end of the casing is comprised by a crowned central section 64 having a perimetrical flange 64a thereon. This central section has an enlarged concentrically positioned opening therein at 72 for the admission of oil to the impeller wheel 75, as will be later described. The rear end is likewise secured to the barrel 50 by bolts 56, which extend freely through holes in the flange 64a and are received in aligned screw threaded holes in the barrel 50.

Figure 2:
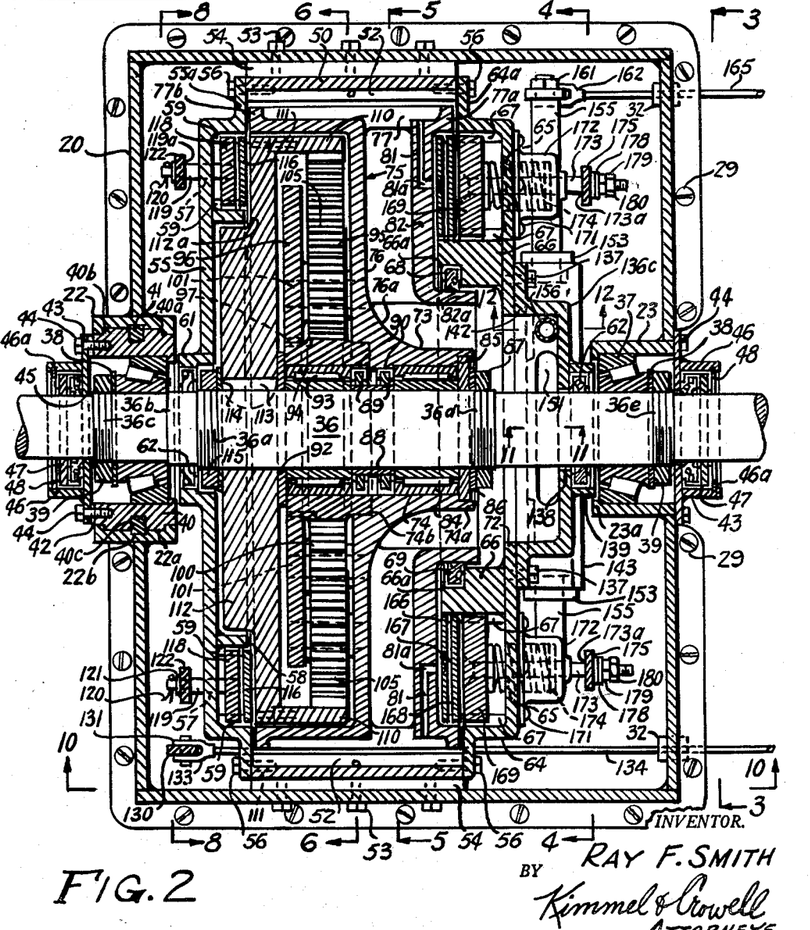
FIGURE 2 is a longitudinal horizontal sectional view through the hydrodynamic brake according to the present invention.

The impeller wheel is shown in FIGURES 2 and 5. This wheel is designated generally by the reference numeral 75 and has a hub 73 with an axial bore 74 therethrough. The impeller wheel is rotatably mounted on the drive shaft 36 by a roller bearing 84, which is force fitted in the bore 74 through the hub and onto the drive shaft adjacent the screw threaded section 36d of the latter. The hub 73 is formed with a counterbore 74a in its outer end and in this counterbore there is received a thrust plate 85 which abuts both races of the roller bearing 84 at the outer end of the latter. A nut 87 is received on the threaded section 36d of the drive shaft and a washer 86 is placed between the nut 87 and the thrust plate 85. A spacer sleeve 88 surrounds the drive shaft 36 and abuts the inner race of the roller bearing 84 on the inner end of the latter. Also in the axial bore 74 there is an oil sealing ring 89 within a retaining ring 90, the latter being U-shaped in cross section and abutting both races of the roller bearing 84 at their inner ends.

The impeller wheel also comprises a central web 76, a rim 77, and an outer web 82. The central web 76 is curved outwardly and downwardly at 76a to merge with the hub 73; the outer web 82 has a right angle section 82a, which is spaced radially outwardly from the hub 73, the annular space between the hub and this right angle section providing for the admission of oil from the enlarged opening 72 in the rear end of the casing, as will be later described. The rim 77 has a slight overhang on its right at 77a (FIGURE 2) and a greater overhang on its left at 77b. On the rim 77 there are formed a plurality of ejecting vanes 78. These vanes cooperate with the arcuately spaced vanes 52 on the inner circumferential wall of the barrel 50. As shown in FIGURE 5, every sixth vane 78 is integrally formed with a delivery vane 79, which latter vanes are inwardly and reversely curved and also integrally formed at their inner ends with the hub 73. Also, every fourth vane 78 is integrally formed with a divider vane 80, which latter vanes are also inwardly and reversely curved but terminate short of the hub 73.

Figure 6:
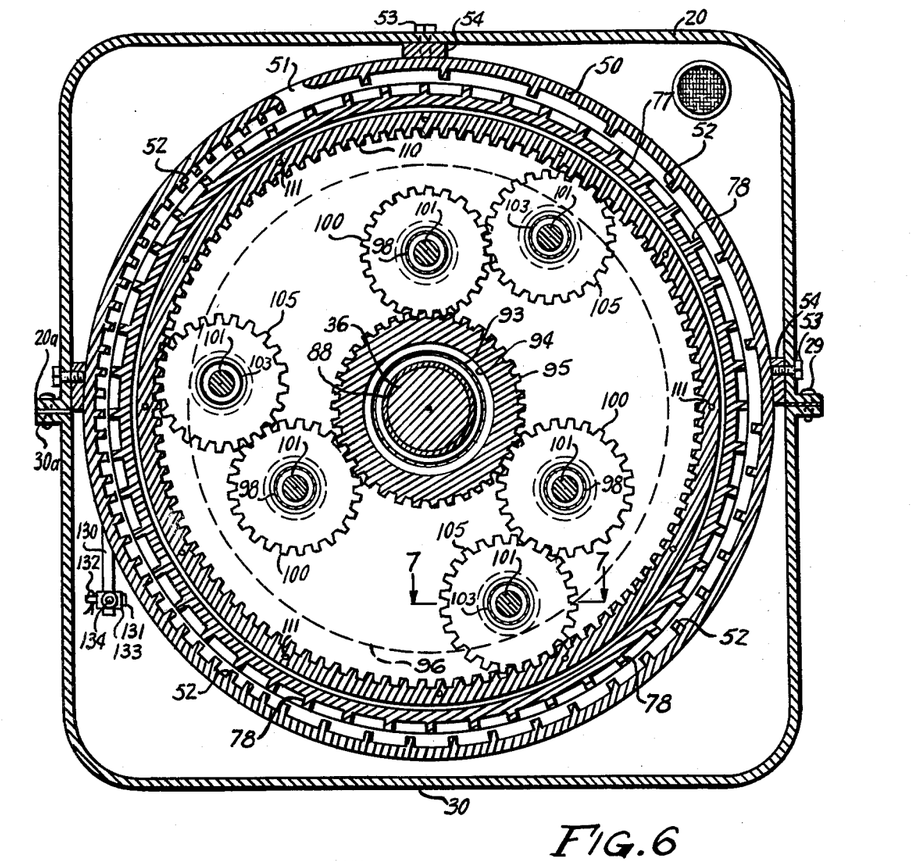
FIGURE 6 is a vertical sectional view, taken on the section line 6—6 of FIGURE 2 and looking in the direction of the arrows, showing the planetary gear train between the impeller wheel and the drive shaft of the motor vehicle.

As shown in FIGURE 6, a planetary gear train is interposed between the drive shaft 36 and the impeller wheel 75. This planetary gear train includes a sun gear 95, which has an axial bore 94 through its hub. In the bore 94 there is force fitted a roller bearing 93, which roller bearing is also force fitted on the drive shaft 36. At its outer end the hub of this sun gear is force fitted in a counterbore 74b in the inner end of the hub 73 of the impeller wheel. The inner race of the roller bearing 93 abuts the spacer sleeve 88 on the drive shaft 36. Also within the axial bore 94 of the sun gear 95 there is a second oil sealing ring 89, which surrounds the spacer sleeve 88 and is mounted within a retaining ring 90, the latter being, as before, U-shaped in cross section and abutting both races of the roller bearing 93 at the inner ends of same.

A circular plate 96 is secured on the outer end of the hub of the sun gear 95 by arcuately spaced keys 97. The planetary gear train also includes a plurality of idler gears 100, three (3) being shown, which mesh with the sun gear 95. Each of these idler gears has an axial bore therethrough in which there is force fitted the outer race of a roller bearing 98, the inner race of the roller bearing being received on an axle 101. While, as shown, the axles 101 are received in suitable holes in the central web 76 of the impeller wheel, a second circular plate 96 may be provided, and the axles 101 received at their inner ends in this latter plate. This second circular plate would be positioned between the central web 76 of the impeller wheel and the sun gear 95 and idler gears 100 and secured to the hub 73 of the impeller wheel by some suitable means, such as by stud bolts. The rotatable mountings of the idler gears 100 are identical with those of the planet gears 105, to be now described.

Figure 7:
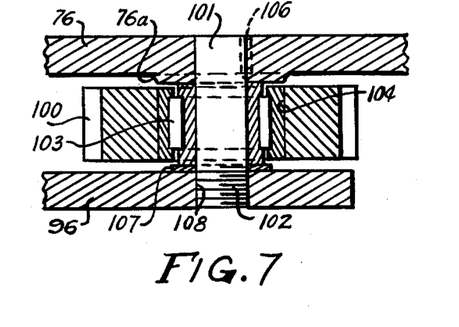
FIGURE 7 is a detail sectional view, taken on the section line 7—7 of FIGURE 6 and looking in the direction of the arrows, showing the mounting of one of the pinions of the planetary gear train.

Each planet gear 105 meshes with an idler gear 100 and preferably the idler gears and the planet gears are all of the same size. It is within the contemplation of the invention however to use planet gears of the step type to provide a gear ratio, if desired. The planet gears 105 are rotatably mounted by roller bearings 103 on short axles 101, as shown in FIGURE 7. These axles 101 are received at one end in suitable holes in the central web 76 of the impeller wheel and at their outer ends are screw threaded and received in suitable holes 108 in the plate 96. Keys 106 between the axles 101 and the central web 76 are provided for preventing rotation of the axles. The roller bearings 103 are force fitted in suitable axial bores 104 in the hubs of the planet gears 105 and on their inner faces they abut bosses 76a on the central web 76 of the impeller wheel 75 and washers 107 are positioned between their outer faces and the plate 96.

In the space at the front of the impeller wheel partially enclosed by the central web 76 and the overhanging section 77b of the rim of the latter, there is mounted a rotatable ring gear 110, which meshes with all of the planet gears 105. This ring gear is secured by pins 111 to a cylindrical rotatable plate 112, which is in turn secured to the drive shaft 36 by a key 113. The plate 112 is reduced in thickness adjacent its circumference, as shown at 112a. A nut 115 is received on the screw threaded section 36a of the drive shaft and a washer 114 is interposed between this nut and the outer face of the plate. Between the inner face of the plate 112 and the roller bearing 93 there is positioned a spacer disc 92, which surrounds the drive shaft 36. The preferred gear ratio of the planetary gear train between the drive shaft 36 and the impeller wheel 75 is 3 to 1.

A friction disc emergency brake operating directly on the drive shaft 32 through the rotatable plate 112 is also provided. This brake replaces the conventional emergency brake on the vehicle and is operated from the usual emergency brake lever. According to the present invention, however, the emergency brake is totally enclosed, except for the operating link, by the housing 20—30. On the inner face of the front end 55 of the impeller casing there is a concentrically positioned flange 58, which may be either integrally formed with the front end or as a separate element and welded thereto. In the annular space between this flange 58 and the skirt on the front end 55 there are positioned an annular friction disc 116 and in front of the latter, an annular pressure plate 118. The friction disc 116 is adapted to bear against the reduced section 112a of the cylindrical plate 112. Along the horizontal center line of the front end 55 the latter is formed on the inner circumferential wall of the skirt with splines 59 and diametrically aligned splines 59 are formed on the internal flange 58. The pressure plate 118 is formed with grooves 117 in its inner and outer circumferences, and the friction disc 116 with similar grooves, which receive the splines 59—59 and are thus constrained against rotation with respect to the front end 55 of the casing but are free for longitudinal movement with respect to same.

The linkage for sliding the pressure plate 116 to force the friction disc 118 against the reduced section 112a of the plate 112 includes rods 119, which are secured to the pressure plate and extend outwardly through holes 57 in the front end 55 of the impeller wheel casing. These rods are reduced in diameter at 119a adjacent their outer ends to form shoulders and rock arms 122 having holes adjacent their lower ends are received on the outer ends 119a of the rods. These rock arms 122 are secured in place by cotter keys 120, which extend through diametrically positioned holes in the outer ends 119a of the rods, washers 121 being positioned intermediate the cotter keys and the rock arms.

A rock shaft 125 is mounted in aligned holes in parallel ears 60—60 on the front end 55 of the casing for the impeller wheel. At its outer end this shaft has an open slot 123 therein in which the upper end of one rock arm 122 is received and secured by a pin 124; adjacent its other end this shaft has a slot 126 therein in which the upper end of the other rock arm 120 is received and likewise secured by a pin 124. On its inner end the rock shaft 125 is formed with a shoulder through the inner end being made square at 125a and of a lesser diagonal dimension than the diameter of the shaft. An arm 130 has holes therein adjacent its upper and lower ends, the hole adjacent the upper end being square so as to be received on the square end 125a of the rock shaft and against the shoulder on the latter. The arm is held in place by a diametrically positioned cotter key 128 inserted in a hole in the square end 125a of the rock shaft, a washer 127 being positioned between the arm and the cotter key. An operating rod 134 is secured to the lower end of the arm 130 by a clevis 133, a bolt 131 extending through the hole adjacent the lower end of the arm and the ears of the clevis and being held in position by a diametrically positioned cotter key 132. This operating rod is connected to the emergency brake lever (not shown) on the vehicle, being slidably received in a bushing 32 in the lower half 30 of the housing.

On the rear end of the casing for the impeller wheel there is mounted a combined cap and oil inlet duct, which is designated generally by the reference numeral 135. As previously stated, the rear end of this casing is comprised by a crowned central section 64, which has a concentrically positioned opening 72 therein. The cap is formed by a flange 136a, which is semi-circular in shape above its horizontal center line and rectangular in shape below the latter, parallel side walls 136b—136b and an end plate 136c, which latter are also semi-circular in shape above the horizontal center line, but of lesser radius than the flange 136a, and rectangular in shape below the horizontal center line, but of lesser width than the flange 136a. The interior of the cap 135 registers with the opening 72 in the rear end 64 and the cap is secured to the rear end by machine screws 137, which extend freely through holes in the flange 136a and are received in aligned screw threaded holes in the rear end 64. In the plate 136a there is a central hole 138, which freely receives the drive shaft 36. At its center the plate 136c has thereon a hub 139, which is secured thereto, as by welding. An oil seal 62 is also received in the hub 139 and contacts the drive shaft 36 intermediate the threaded sections 36d and 36e on the latter.

The oil inlet duct is comprised by a rear wall 136d, which is an extension of the flange 136a of the cap, side walls 136e—136e, which are extensions of the semicircular side walls 136b—136b of the cap, and a front wall 136f, which is an extension of the end plate 136c of the cap. The rear wall 136d has an enlarged opening 142 adjacent its top, which registers with the opening 72 in the rear end 64 of the impeller casing. The duct is open at its bottom and terminates in a plane slightly above the bottom of the lower section 30 of the housing and above the normal oil level in same.

Figures 10, 11, 12:
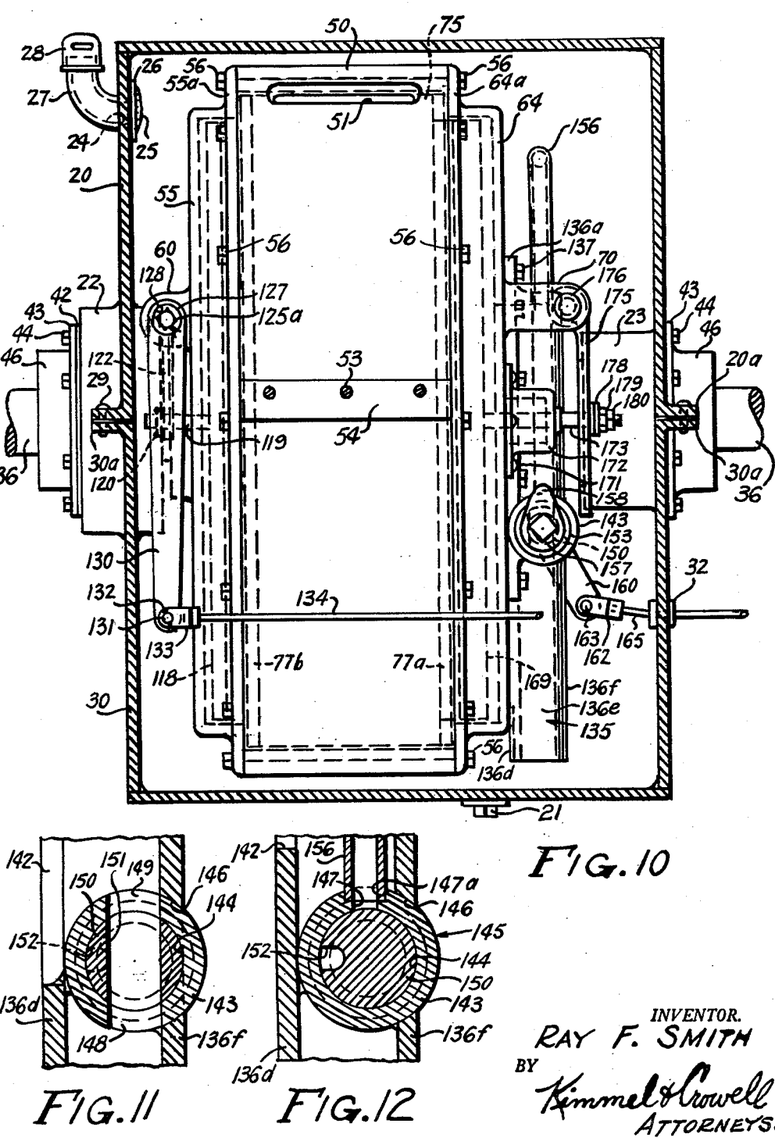
FIGURE 10 is a longitudinal vertical sectional view, taken on the line 10—10 of FIGURE 2 and looking in the direction of the arrows, showing the linkages for operating the two disc type brakes.
FIGURE 11 is a detail sectional view, taken on the section line 11—11 of FIGURE 2 and looking in the direction of the arrows, showing the control valve in the position for supplying oil to the impeller wheel.
FIGURE 12 is a detail sectional view, taken on the section line 12—12 of FIGURE 2 and looking in the direction of the arrows, showing the vent conduit from the control valve to the top of the housing.

A control valve, designated generally by the reference numeral 145, is provided for initiating, varying and stopping the admission of oil to the casing of the impeller wheel. This control valve is comprised in part by a cylindrical housing 143 having an axial bore 144 therethrough. The valve housing is mounted in a transversely positioned slot 146 in the front wall 136f and is tangentially positioned with respect to the rear wall 136d of the oil inlet duct. It is held in place by welds to the bottom wall of the slot 146 and the wall of the opening 142 in the front wall 136d. The valve housing has an oil inlet port 148 therein, which is open to the bottom of the oil inlet duct, and an oil outlet port 149 which is open to the interior of the cap 135. A rotatable valve member 150 is mounted in the axial bore 144 of the housing 143. This valve member is formed as an enlarged section of a shaft 155. Discs 153—153 are force fitted on the shaft 155 and abut the valve housing 143 at its opposite ends. Sealing washers may be placed intermediate the discs 153 and the adjacent ends of the valve housing 143, if desired. In the valve member 150 there is formed a diametrically positioned and lengthwise extending passage 151 having rounded ends. When the valve member 150 is in the position shown in FIGURE 11, the passage 151 therein registers with both the inlet port 148 and the outlet port 149 in the valve housing 143. A radially positioned and lengthwise extending passage 152 is also formed in the valve member 150. In the top of the valve housing 143 and to the right (FIGURE 4) of the outlet port 149, there is a radial hole 147, which is an air vent passage. The valve housing 143 is formed with a counterbore 147a at the top of the hole 147 and an air vent tube 156 is received at its bottom in this counterbore. This air vent tube passes through an opening 140 in the cap 135, in which opening it has a fluid tight seal, and at its upper end is curved at 156a. When the rotatable valve member 150 is in the position rotated 90° in the clockwise direction from that shown in FIGURE 12, the passage 151 therein is out of alignment with the inlet port 148 and the outlet port 149 in the valve housing 143 and fluid communication through the valve is closed off. At the same time, however, the passage 152 in the rotatable valve member registers with the hole 147 and the outlet port 149 in the valve housing 143 and air is admitted from the vent tube 156 to the interior of the cap 135.

A linkage is provided for partially rotating the valve shaft 155. At its right end (FIGURE 4), the valve shaft is reduced in diameter at 155a to form a shoulder. An arm 160 has holes therein adjacent its upper and lower ends and is received on the reduced end 155c of the valve shaft and held in place by a nut 161. A clevis 162 is secured to the arm 160 by a bolt 163, which extends through the hole adjacent the lower end of the arm and the ears of the clevis and is held in place by a diametrically positioned cotter key 164. To this clevis there is secured an operating rod 165 which extends to a suitable location adjacent the driver's seat on the vehicle, passing through a bushing 32 in the lower section 30 of the housing.

A second friction disc brake is provided for braking at low speeds. This brake is operated by a flexible rod or cable from the accelerator pedal on the motor vehicle and is effective during the last third of the range of travel of the latter to closed throttle position. On the inner face of the rear end 64 of the impeller casing there is a concentrically positioned flange 66, which may be either integrally formed with the front end or as a separate element and welded thereto. The lower left corner of this flange is cut away in a right angle groove at 66a and in this groove there is mounted a sealing ring 68, which bears on the outer hub 82a of the impeller wheel. A spring ring 69 holds the sealing ring in place, this spring ring being received in an annular groove in the side wall of the sealing ring 68.

In the annular space between the flange 66 and the skirt on the front end 64 there are positioned an annular friction disc 166 and an annular washer plate 168. The annular friction disc 166 bears on the outer web 82 of the impeller wheel during the braking action. This outer web 82 is provided with a plurality of arcuately spaced and radially positioned passages 81, which extend from the rim 77 to a circle concentric with respect to the mid-circle of the friction disc 166. These passages 81 have right angle extensions 81a, which are disposed toward the friction disc. The latter has a diametrically positioned groove 167 therein, which prevents oil lock between the friction disc and the outer web 82 of the impeller wheel. Along the horizontal center line of the rear end 64 the latter is formed on the inner circumferential wall of the skirt with splines 67 and diametrically aligned splines 67 are formed on the internal flange 66. An annular pressure plate 169 is mounted in the annular space between the rear end 64 and the flange 66. This pressure plate has grooves 170 in its inner and outer circumferences, and aligned grooves are formed in the inner and outer circumferences of the friction disc 166 and the pressure plate 168 which grooves receive the splines 67—67 and the friction disc and plates are accordingly constrained against rotation with respect to the rear end 64 of the casing but are free for longitudinal movement with respect to same. The rear end 64 of the casing has a pair of holes 65—65 therein positioned along its horizontal diameter and over these holes there are secured flanged caps 172, which are held in place on the rear end by screws 171. Rods in the form of bolts 173, preferably of the stove type, are secured to the pressure plate 169 and extend outwardly through suitable holes in the caps 172. Coiled compression springs 174 surround the rods 173 and at their inner ends bear against the pressure plate 169 and at their outer ends against the caps 172. The rods 173 are reduced in diameter at their outer ends at 173a to form shoulders, these outer ends being suitably threaded. The pressure plate 169 is moved outwardly by rocker arms 175—175, which are pivotally mounted on the rear end 64. These rocker arms 175 are formed at their tops with hollow bosses 175a which are received between parallel lugs 70—70 on the rear end 64. Bolts 176 extend through aligned holes in the ears 70 and the bosses 175a and are held in place by diametrically positioned cotter keys 177. At approximately their mid-sections the rocker arms 175 are formed with holes, which receive the reduced ends of the rods 173. Washers 178, nuts 179 and lock nuts 180 secure the rocker arms in place on the bolts 170. The rocker arms 175—175 are positioned to be engaged by cams 158—158 on the valve shaft 155. At its left end (FIGURE 4) this shaft is reduced in diameter to form a shoulder at 155b and one cam 158 is secured thereon by a nut 157. The cam 158 adjacent the right end is secured to the shaft 155 by a diametrically positioned pin 159.

It will be apparent that the coiled compression springs 174—174 normally exert force through the pressure plate 169 and washer disc 168 to hold the friction disc 166 against the outer web 82 of the impeller wheel. However during the normal operation of the vehicle, the oil pressure is built up around the rim 77 and oil flows through the arcuately spaced and radially positioned passages 81 in the outer web 82 of the impeller wheel and holds the annular friction disc 166 away from the outer web 82, against the forces exerted by the coiled compression springs 174—174.

In the operation of the device as a whole, it will be apparent that during the normal operation of the vehicle, the drive shaft 36 imparts rotation to the plate 112, and through the planetary gear train comprised by the ring gear 110, planet gears 105, idler gears 106 and sun gear 95 to the impeller wheel 75, the plate 112 and the impeller wheel 75 functioning as flywheel components. The inclusion of the idler gears 100 in the planetary gear train provides that the drive shaft 36 and the impeller wheel 75 shall always rotate in the same direction. When the impeller wheel 75 is functioning as a flywheel component, the impeller casing 50 is substantially empty of oil. When operating in this manner, the control valve 145 is in a position wherein it closes off communication through the oil inlet duct 135 from the bottom section 30 of the housing to the casing 50 of the impeller wheel but the radial passage 152 in the valve is aligned with the outlet port 149 in the valve housing 143 and with the air vent tube 156. Thus, the impeller wheel 75 does not have to work against a vacuum.

When the vehicle is to be accelerated, assuming that same is travelling at a speed of more than ten miles per hour, which usually corresponds to a crank shaft angular velocity of 300 r.p.m., the accelerator pedal (not shown) is depressed. This, of course, increases the fuel supply to the engine. As stated, the cable or rod 165 is connected to the accelerator pedal. At the same time that the accelerator pedal is depressed, the shaft 155 will be partially rotated and the diametrically extending passage 151 in the rotatable valve member 150 is moved out of alignment with the oil inlet port 148 and oil outlet port 149 in the valve housing 143 (FIGURE 11) and the radially positioned passage 152 in the rotatable valve member is moved into alignment with the outlet port 149 in the valve housing and the lower end of the air vent tube 156. The supply of oil to the interior of the impeller casing 50 through the combined cap and oil inlet duct 135 is cut off but the impeller wheel does not have to work against a vacuum since air is admitted to the casing 50 through the air vent tube 156. Due to the decreased oil pressure within the impeller casing 50, little or no oil flows through the arcuately spaced and radially positioned passages 81 in the outer web of the impeller wheel and the compression springs 174—174 force the friction disc 166 against the outer web 82 of the impeller wheel to apply braking force to the latter.

When the vehicle is to be decelerated, assuming again that same is travelling at a speed of more than ten miles per hour, the accelerator pedal is released. The accelerator pedal on the ordinary motor vehicle has a six inch (6″) travel on the return stroke from fully open to fully closed throttle position. The cable or rod 165 is connected to the accelerator pedal in such manner that it will be operated only during the last third or two inches (2″) of travel of the accelerator pedal on the return stroke of the latter. As the accelerator pedal is released the fuel supply to the engine is of course gradually cut off. At the same time the valve shaft 155 will be partially rotated to the position shown in FIGURE 11 and the diametrically extending passage 151 in the rotatable valve member 150 will be moved into alignment with the oil inlet port 148 and the oil outlet port 149 in the valve housing 143, and the radially positioned passage 152 in the valve member is moved out of alignment with the outlet port 149 in the valve housing and the lower end of the air vent tube 156. Oil is then admitted from the lower housing section 30 through the combined cap and oil inlet duct 135 into the impeller casing 50, passing through the right angle passage between the hub 73 of the impeller and the right angle extension 82a of the web 82 and between the central web 76 and the outer web 82.

As the valve shaft 155 is partially rotated to the stated position, the cams 158—158 free the rocker arms 175—175 and the compression springs 174—174 are free to force the annular friction disc 166 against the outer web 82 of the impeller wheel. However, as above stated, during the normal operation of the vehicle, the area around the periphery of the rim 77 is a high pressure area and the oil flows through the arcuately spaced and radially positioned passages 81 in the outer web 82 of the impeller wheel and against the annular friction disc 166. At travelling speeds above ten miles per hour, the pressure of the oil against the annular friction disc 166 holds the latter away from the outer web 82 of the impeller wheel, against the forces exerted by the coiled compression springs 174—174.

The oil thrown through the radial channel between the central web 76 and the outer web 82 of the impeller wheel 75 is ejected by the ejecting vanes 78, delivery vanes 79, and divider vanes 80, and impinges on the vanes 52 on the interior of the impeller wheel casing 50 to produce a reaction effect. This retards the rotation of the impeller wheel 75, which retardation is transmitted through the described planetary gear train to the circular plate 112 and the drive shaft 36. As previously stated, the planetary gear train provides a 3 to 1 ratio between the impeller wheel 75 and the plate 112, or drive shaft 36.

When the vehicle has been decelerated to a speed of approximately ten miles per hour, which, as stated usually corresponds to a crank shaft angular velocity of 300 r.p.m., the oil pressure developed by the impeller wheel 75 is greatly reduced and is ineffective on the pressure plate 166 to overcome the forces of the compression springs 174–174. If it should then be desired to again accelerate the vehicle before same has been brought to a complete stop, this braking effect can be released by operating the rod 165 to partially rotate the valve shaft 155 and the cams 158—158 to swing the rocker arms 175—175 and overcome the forces of the compression springs 174—174.

The vehicle may be brought to a stop at any time by the use of the friction disc emergency brake. This brake may be used as an alternative to the retarding action of the impeller wheel 75. Operation of the rod 134 will partially rotate the rocker arm 130 and the rock shaft 125. The arms 122—122 on the latter will force the rods 119—119 inwardly and the pressure plate 118 will push the friction disc 116 inwardly against the reduced rim section 112a of the plate 112.

As many embodiments may be made of this inventive concept, and as many modifications may be made in the embodiments hereinbefore shown and described, it is to be understood that all matter herein is to be interpreted merely as illustrative and not in a limiting sense.

Having now fully described my invention, what I claim as new and useful and desire to secure by Letters Patent of the United States is:

1. A speed retarder for motor vehicles comprising a drive shaft, a fixed impeller wheel casing surrounding the drive shaft, an impeller wheel mounted within the casing on the drive shaft for rotation with respect to the latter, and a planetary gear train between the drive shaft and the impeller wheel comprised by a ring gear secured to the drive shaft, planet gears meshing with the ring gear, idler gears meshing with the planet gears, and a sun gear secured to the impeller wheel and meshing with the idler gears.

2. A speed retarder for motor vehicles comprising a drive shaft, a fixed impeller wheel casing surrounding the drive shaft, an impeller wheel mounted within the casing on the drive shaft for rotation with respect to the latter, a disc secured to the drive shaft, and a planetary gear train between the drive shaft and the impeller wheel comprised by a ring gear secured to the disc planet gears meshing with the ring gear, idler gears meshing with the planet gears, and a sun gear secured to the impeller wheel and meshing with the idler gears.

3. A speed retarder for motor vehicles comprising a drive shaft, a fixed impeller wheel casing having a closed end surrounding the drive shaft, a disc secured to the drive shaft, a gear train between the disc and the impeller wheel, and a friction disc brake comprised by an annular braking disc and a pressure plate mounted within the impeller wheel casing and movable axially into engagement with said disc, rods secured to said pressure plate extending through the end wall of the impeller wheel casing, and linkage connected to said rods for reciprocating the latter.

4. A speed retarder for motor vehicles comprising a drive shaft, a fixed impeller wheel casing surrounding the drive shaft, an impeller wheel mounted within the casing on the drive shaft for rotation with respect to the latter comprised by a hub, a central flange merging with hub, an outer flange spaced axially from the central flange and having an extension spaced outwardly from and concentrically with respect to the hub to form merging oil inlet and outlet passages through the wheel, and a gear train between the drive shaft and the impeller wheel.

5. A speed retarder for motor vehicles comprising a drive shaft, a fixed cylindrical impeller wheel casing having vanes on its inner circumference surrounding the drive shaft, an impeller wheel having an axially positioned oil inlet passage and a radially positioned oil outlet passage formed therein and vanes on its circumference mounted within the casing on the drive shaft for rotation with respect to the latter, and a gear train between the drive shaft and the impeller wheel.

6. A speed retarder for motor vehicles comprising a drive shaft, a fixed impeller wheel casing having closed ends and vanes on its inner circumference surrounding the drive shaft, an impeller wheel having an axially positioned oil inlet passage and a radially positioned oil outlet passage formed therein and vanes on the circumference mounted within the casing on the drive shaft for rotation with respect to the latter, a step up gear train between the drive shaft and the impeller wheel providing for relative rotation of the latter with respect to the former and operation as a fly wheel, and a control valve mounted in the end of the casing adjacent the impeller wheel for admitting fluid to the latter.

7. A speed retarder for motor vehicles comprising a drive shaft, a fixed impeller wheel casing having closed ends and vanes on its inner circumference surrounding the drive shaft, an impeller wheel having an axially positioned oil inlet passage and a radially positioned oil outlet passage formed therein and vanes on the circumference mounted within the casing on the drive shaft for rotation with respect to the latter, a gear train between the drive shaft and the impeller wheel, an air vent tube in the end of the casing adjacent the impeller wheel, and a control valve in the latter end of the casing for selectively admitting fluid or air to the latter.

8. A speed retarder for motor vehicles comprising a drive shaft, a fixed impeller wheel casing having a closed end surrounding the drive shaft, an impeller wheel mounted on the drive shaft for rotation with respect to the latter, a gear train between the drive shaft and the impeller wheel, and a friction disc brake comprised by an annular braking disc and a pressure plate mounted within the casing, springs between said pressure plate and the end wall of the casing for forcing the braking disc axially into engagement with the impeller wheel, rods secured to said pressure plate extending through the end wall of the casing, and linkage connected to said rods for moving the pressure plate against the action of said springs.

9. A speed retarder for motor vehicles comprising a drive shaft, a fixed impeller wheel casing having closed ends and vanes on its inner circumference surrounding the drive shaft, an impeller wheel having an axially positioned oil inlet passage and a radially positioned oil outlet passage formed therein and vanes on its circumference mounted within the casing on the drive shaft for rotation with respect to the latter, a gear train between the drive shaft and the impeller wheel, a control valve in the end of the casing adjacent the impeller wheel for admitting fluid to the latter, a friction disc brake comprised by an annular braking disc and a pressure plate mounted within the impeller wheel casing, springs between said pressure plate and the latter end of the casing for forcing the braking disc axially into engagement with the impeller wheel, rods secured to said pressure plate extending through the end wall of the casing and linkage including rocker arms engaged with said rods and cams co-acting with the rocker arms for releasing the pressure plate for movement by the springs when the control valve is moved to open position.

10. A speed retarder for motor vehicles comprising a drive shaft, a fixed cylindrical impeller wheel casing having radially extending vanes on its inner circumference, an impeller wheel having radially extending vanes on its circumference mounted within the casing on the drive shaft for relative rotation with respect to the latter and a planetary gear train between the drive shaft and the impeller wheel comprised by a ring gear secured to the drive shaft, planet gears meshing with the ring gear, idler gears meshing with the planet gears, and a sun gear secured to the impeller wheel and meshing with the idler gears.

11. A speed retarder for motor vehicles comprising a drive shaft, a fixed cylindrical impeller wheel casing having radially extending vanes on its inner circumference, an impeller wheel having radially extending vanes on its circumference mounted within the casing on the drive shaft for relative rotation with respect to the latter, a disc secured to the drive shaft, and a planetary gear train between the drive shaft and the impeller wheel comprised by a ring gear secured to the disc, planet gears meshing with the ring gear, idler gears meshing with the planet gears, and a sun gear secured to the impeller wheel and meshing with the idler gears.

12. A speed retarder for motor vehicles comprising a drive shaft, a fixed impeller wheel casing having a closed end surrounding the drive shaft, an impeller wheel mounted within the casing on the drive shaft for relative rotation with respect to the latter, a disc secured to the drive shaft within the impeller wheel casing, a planetary gear train between the drive shaft and the impeller wheel including a ring gear secured to the disc secured to the drive shaft, a sun gear secured to the impeller wheel, and planet gears between the ring gear and the sun gear, and a friction disc brake comprised by an annular braking disc and a pressure plate mounted within the impeller wheel casing and movable axially into engagement with said disc secured to the drive shaft, springs between said pressure plate and the end wall of the casing for forcing the braking disc axially into engagement with the disc secured to the drive shaft, rods secured to said pressure plate extending through to the end wall of the casing, and a linkage connected to said rods for reciprocating the latter.

13. A speed retarder for motor vehicles comprising a drive shaft, a fixed cylindrical impeller wheel casing having radially extending vanes on its inner circumference, an impeller wheel having an axially extending oil inlet passage and a radially positioned oil outlet passage and radially extending vanes on its circumference mounted within the casing on the drive shaft for relative rotation with respect to the latter, and a planetary gear train between the drive shaft and the impeller wheel.

14. A speed retarder for motor vehicles comprising a drive shaft, a fixed cylindrical impeller wheel casing, having radially extending vanes on its inner circumference, an impeller wheel having an axially positioned oil inlet passage and a radially positioned oil outlet passage and radially extending vanes on its circumference mounted within the casing on the drive shaft for relative rotation with respect to the latter, a control valve on the impeller wheel casing adjacent the end of the axially extending inlet passage in the impeller wheel, and a planetary gear train between the drive shaft and the impeller wheel.

15. A speed retarder for motor vehicles comprising a drive shaft, a fixed impeller wheel casing having closed ends surrounding the drive shaft, an impeller wheel mounted within the casing on the drive shaft for relative rotation with respect to the latter, a disc secured to the drive shaft within the impeller wheel casing, a planetary gear train between the drive shaft and the impeller wheel including a ring gear secured to the disc, a sun gear secured to the impeller wheel and planet gears between the ring gear and the sun gear, an emergency brake comprised by annular braking disc and a pressure plate mounted within the impeller wheel casing and movable axially into engagement with the disc on the drive shaft, springs between said pressure plate and an end wall of the impeller wheel casing for forcing the braking disc axially into engagement with said disc, rods secured to said pressure plate extending through said end wall, and a linkage connected to said rods for reciprocating the latter, and a friction disc operating brake comprised by an annular braking disc and a pressure plate mounted within the impeller wheel casing and movable axially into engagement with the web of the impeller wheel, springs between said latter pressure plate and the other end wall of the impeller wheel casing for forcing the latter braking disc axially into engagement with the impeller wheel, rods secured to said latter pressure plate extending through the latter end wall of the casing, and a linkage connected to said latter rods for reciprocating the latter.

References Cited in the file of this patent
UNITED STATES PATENTS

| | | |
|---|---|---|
| 2,185,491 | Anderson et al. | Jan. 2, 1940 |
| 2,219,215 | Anderson | Oct. 22, 1940 |
| 2,241,189 | Dick | May 6, 1941 |
| 2,517,531 | Anderson | Aug. 8, 1950 |
| 2,543,929 | Olman | Mar. 6, 1951 |
| 2,775,318 | Smith | Dec. 25, 1956 |
| 2,981,380 | Lessly | Apr. 25, 1961 |